United States Patent Office 2,927,021

Patented Mar. 1, 1960

2,927,021

METHOD OF PRODUCING A RELIEF IMAGE

Jack L. Sorkin, Cleveland Heights, Ohio, assignor to Horizons Incorporated, Princeton, N.J., a corporation of New Jersey No Drawing. Application March 27, 1956
Serial No. 574,077

3 Claims. (Cl. 96—35)

This invention relates to a novel method for producing photo-resists and lithographic plates and to a stable system used in the method. More particularly it relates to a procedure in which a substrate coated with a composition which includes a ferric compound is converted to an active condition by exposure to ultraviolet illumination. After exposure an image on the coated substrate is developed by contact with peroxides whereby the exposed areas of the coating are converted to water-insoluble compositions while the unexposed areas remain water soluble. Thereafter, the soluble portions are washed away to produce the desired resist or lithographic plate, which may be further processed to render same more durable, if desired.

Systems based on the oxidation and reduction of iron compounds are notoriously old in photographic processes but such systems generally suffer from a tendency to instability, although many such systems are used in blueprint production and similar processes where this is not critical.

Furthermore, systems bearing a superficial resemblance to the system about to be described have been employed in the production of photo-resists as set forth in United States Patent 2,568,503, wherein a method is described for the production of lithographic printing plates in which a cellulose organic acid ester sheet, sensitized with a ferric ammonium salt is exposed to ultraviolet light and is thereafter oxidized to produce an alkali soluble oxidized product, in contrast to the water insoluble product obtained by the practice of my invention.

In accordance with my invention, a solution containing suitable proportions of (1) one or more water soluble resins; (2) at least one ferric compound having the desired stability in the solution; (3) at least one organic acid; and (4) one or more coloring agents, is applied as a coating to any suitable support and is dried thereon. Thereafter a negative or a positive or a stencil or any suitable mask is positioned on the coated support and while so arranged, the assembled elements are exposed to light containing light of the ultraviolet wave lengths for a sufficient time to convert the ferric compound to a state in which it appears to be capable of catalyzing a reaction between peroxides and the resin (or resins) so that the transformation of the resin is effected rapidly. After the ferric compound has been activated, the positive or negative is removed and the desired conversion of the resin component of the coating is accomplished by contacting the coated member with a peroxide for a sufficient time to permit the peroxide to penetrate the entire thickness of the coating. As a result of this treatment the portions of the resin in the portions of the coating which have been exposed to the ultraviolet light are converted by the peroxide, catalyzed by the active iron compound in those portions, to water insoluble products while the solubility of the unexposed portions remained relatively unaffected. In the next step of the process, a relief is produced by washing the exposed-developed plate to wash off the water soluble portions. The resulting resist or lithographic plate may be used in the form in which it then exists or it may be subjected to further treatment in a manner well known in the art, for example to harden the raised portions of the surface.

More specifically, I have found that satisfactory resists or lithographic plates may be produced on substrates made of virtually any solid material. Substrates of metal, glass and plastic have all been used to produce the desired product and these have been either opaque or translucent. My process requires only a slight modification in order to accommodate these two classes of substrates. With opaque supports, it is necessary that the negative or positive to be reproduced in relief be positioned so that the ultraviolet illumination passes through it before falling on the sensitive coating supported on the opaque substrate. When the substrate is translucent, the positive or negative or stencil may be positioned adjacent the substrate instead of the coating, thus avoiding any disfiguration or injury of the relatively delicate coating during the exposure step.

The coating is produced from an aqueous solution containing (1) at least one water soluble resin, (2) a ferric salt, and (3) an organic acid. Optionally the solution may also contain (4) a coloring agent and/or (5) one or more plasticizers. One or more of these ingredients may be either dissolved or dispersed in water, or in some instances in mixtures of water and alcohol or other organic solvent, compatible with water.

Among the water soluble resins which I have found to satisfactory in the practice of this invention are polyvinyl alcohol, vinyl methyl ether-maleic anhydride copolymer, and similar compounds. In incorporating these materials into the aqueous solution, either water solutions, water and alcohol solutions, or the material in dry form may be employed. I have found that mixtures of water soluble resins are as effective as solutions containing but a single resin, provided they remain stable in the ultimate coating solution.

The second component required in my coating composition is a ferric salt. I prefer to use ferric ammonium citrate, although ferric ammonium oxalate and ferric ammonium tartrate have also been found to be sufficiently stable for my purposes in solutions containing the water soluble resin and organic acid.

The organic acids found to be effective in the process outlined above include citric acid, oxalic acid, tartaric acid, and in general may be said to include any polycarboxylic acid having the required water solubility.

To better delineate the pattern obtained in the process, a coloring agent may be included in the coating formulation. This may be either a pigment or a dye provided the material chosen is compatible with the remaining constituents and provided the coloring material is one which will not interfere with the penetration of the ultraviolet light into the coating.

In preparing the above described coating mixture, the several ingredients may be mixed wet, that is, in the form of aqueous solutions, or in the form of dry and preferably powdered materials. When a dry mixture is prepared, the components are mixed with Dry Ice and the mixture is pulverized. The resulting blended dry composition may be stored until it is desired to practice the method, since it has been found preferable to use freshly prepared solutions in carrying out the process.

Once the coating solution has been formulated, and prior to the actual coating operation it has been found to be desirable to strain the solution through flannel or through a very fine sieve to remove bubbles and solids from the solution. The solution is then ready to apply to any suitable substrate provided the substrate has been cleaned by any of the usual cleaning procedures common in the art. Metal plates for example may be degreased with trichloroethylene, washed with distilled water and pre-etched with a dilute acid prior to coating. Glass or plastic may also be degreased, then rinsed in alcohol and dried. Whatever the method followed, it should be understood that the substrate should be thoroughly cleaned prior to the coating step.

The coating step may be effected by any of the usual techniques. With the solutions I have prepared, I have found that whirling the plate produces a coating which tends to be desirably uniform in thickness. However, the coatings may be applied by any other suitable technique such as dipping, spraying, roll coating and the like without departing from the methods contemplated within my invention. Once a uniform coating is applied it is allowed to dry on the plate. When dry, the coated plate may be stored for an indefinite period without any noticeable deterioration because the constituents of the coating solution do not react appreciably until activated by a combination of influences.

The first of these activating influences is ultraviolet illumination. A member carrying the pattern to be reproduced in relief is positioned adjacent to the coating (in the case of an opaque substrate) or adjacent to the substrate (in the case of a translucent substrate) and the resulting assembly is exposed to ultraviolet illumination. Any source of ultraviolet may be used, even ordinary sunlight, provided that the exposure is for a time interval sufficient to convert the ferric compound to a form in which it is capable of catalyzing are action between the resin in the coating and a peroxide oxygen. By positioning the lamp nearer or further from the sensitive coating the interval of exposure may be shortened or lengthened, as is well understood. After exposure for a suitable interval, the coated plate and the mask or stencil are separated in preparation for the next step, the development of the resist.

The plate is developed by contacting the activated coating with a peroxide oxygen for a sufficient time to insolubilize the resin in the coating. While virtually any peroxide oxygen containing compound may be used, hydrogen peroxide is preferred for reasons of economy. Other sources of "per"-oxygen which have also been used to develop the resist are urea peroxide and sodium perborate, illustrative of organic peroxides and inorganic persalts. Use of the latter merely requires adjustment of the time of contact to complete the reaction.

The reaction between the peroxide and the coating results in the insolubilization of those portions of the coating which have been exposed to ultraviolet and hence contain the activated ferric salt. The remaining portions of the coating which were water soluble to start with and the solubilization of which has not been appreciably affected by the foregoing treatments, may be washed away by tap water. With this operation, the resist is completed.

If desired, however, the coating may be hardened by subjecting the resist to the action of conventional hardening agents such as tannic acid and formaldehyde.

To remove the resist from the substrate, it is only necessary to soak in an organic softening agent such as dilute oxalic acid and thereafter sponge, brush, rub or merely wash off the softened coating.

The following examples of the novel processes of the present invention are given for purposes of illustration and are not to be taken by way of limitation:

*Example 1*

A photosensitive coating solution consisting of:

| | G. |
|---|---|
| Polyvinyl alcohol | 100 |
| Ferric ammonium citrate | 50 |
| Citric acid | 50 |
| Coloring matter | 5 |

was formed by mixing the dry ingredients in the order named into 1537 cc. of water. The solution was strained through flannel and the clarified filtrate was applied to an aluminum plate by means of a whirling coating machine in the usual manner. The coating was allowed to dry in air. The coated aluminum plate was placed on a suitably supported stencil of a pattern to be reproduced with the pattern in contact with the coating. The plate was exposed to the illumination of an RS reflector type sun lamp positioned 7 inches from the side of the assembly with the stencil. After exposure for 120 seconds, the lamp was shut off and the plate and stencil were separated. The activated plate was immersed in a 0.2% solution of hydrogen peroxide at room temperature for 1 minute. The plate was withdrawn and washed under a stream of cold tap water.

*Example 2*

A coating solution was formed of the following:

| | G. |
|---|---|
| 10% PVA solution (52–22 DuPont) | 100 |
| 10% citric acid solution | 50 |
| 50% ferric ammonium citrate (green scales) solution | 10 |
| 5% Monastral Blue (WDBP 192D—DuPont solution) | 10 |
| | 170 |

The solution was applied to a clean aluminum substrate in the same manner as in Example 1, with comparable results.

*Example 3*

A coating solution was prepared by combining the following solutions in the proportions stated:

| | Parts |
|---|---|
| 5.25% solution of vinyl methyl ether-maleic anhydride copolymer | 20 |
| 2.7% solution of a dye | 1 |
| 50% solution of ferric ammonium citrate | 1 |

(Parts and percents are by weight.)

The coating was applied to aluminum which had been subjected to anodic oxidation in a manner well known in the art, to produce a coating of aluminum oxide on the surface of the aluminum, e.g. by electrolytic treatment in solutions of oxalic acid in Unted States Patent 1,946,150, issued February 6, 1934, to Edwards. After the coating was dried, a stencil was positioned thereon and the assembly was exposed to ultraviolet radiation as in Example 1, for 2 minutes at 7 inches source to coating distance. After exposure and after separation of the stencil, the sensitized plate was developed by contact with a 3% $H_2O_2$ solution and then washed with cold water. The resulting product was adapted to be used as a lithographic plate.

*Example 4*

The procedure of Example 3 was repeated with a clean aluminum substrate which had not been anodized. The coating formulation was a solution consisting of:

| | Parts by weight |
|---|---|
| 10% polyvinyl alcohol | 20 |
| 50% ferric ammonium citrate (green) | 2 |
| 10% oxalic acid | 10 |
| Dye solution | 1 |
| 5% vinyl methyl ether-maleic anhydride copolymer | 2 |

Exposure (2 minutes) developer (3% $H_2O_2$) and wash (cold $H_2O$) were the same as in Example 3 and the resist produced was comparable to that of Example 3.

I claim:

1. A method of producing a relief image of a pattern on a suitable substrate which comprises: preparing an aqueous coating solution containing: a mixture of water-soluble polyvinyl compounds consisting principally of polyvinyl alcohol and a lesser amount of vinyl methyl ether-maleic acid anhydride copolymer, at least one polycarboxylic acid selected from the group consisting of oxalic acid, citric acid and tartaric acid, and at least one ferric ammonium salt selected from the group consisting of ferric ammonium citrate, tartrate and oxalate, wherein the said ferric salt stabilizes the coating solution; applying the aqueous coating solution to a clean substrate, drying the resultant coating produced on the substrate; positioning a mask so that when illuminated it will project an image of the pattern to be reproduced upon the coating; exposing the coated substrate to ultraviolet illumination to activate the iron compound distributed in the illuminated portions of the coating; removing the mask; developing the exposed plate by contacting the coating with a dilute solution of hydrogen peroxide to insolubilize the water-soluble organic compound in the areas struck by the ultraviolet illumination; and washing off the soluble areas.

2. The method of claim 1 in which the ferric compound is ferric ammonium citrate.

3. The method of claim 1 in which the washed relief is hardened after washing.

References Cited in the file of this patent

UNITED STATES PATENTS

| | | |
|---|---|---|
| 770,533 | Ostwald et al. | Sept. 20, 1904 |
| 2,058,396 | Baker | Oct. 27, 1936 |
| 2,413,630 | Husek | Dec. 31, 1946 |

FOREIGN PATENTS

| | | |
|---|---|---|
| 665,649 | Great Britain | Jan. 30, 1952 |

OTHER REFERENCES

Tory: Photolithography, Graphic Arts Monthly, Chicago, 1953, pp. 148, 157, 233.

Wall: Photographic Facts and Formulas, Amer. Photo-Publ. Co., 1924, pp. 265–266.

Tory: Photolithography, Graphic Arts Monthly, Chicago, Ill., 1953, p. 48.

Hinman: "The Chemical Bulletin," vol. 20, No. 2, p. 31.